United States Patent [19]
Ohta

[11] Patent Number: 5,381,871
[45] Date of Patent: Jan. 17, 1995

[54] AUTOMOTIVE REAR BODY STRUCTURE

[75] Inventor: Michitaka Ohta, Hiroshima, Japan

[73] Assignee: Mazda Motor Corporation, Hiroshima, Japan

[21] Appl. No.: 134,877

[22] Filed: Oct. 12, 1993

Related U.S. Application Data

[63] Continuation of Ser. No. 849,341, Mar. 11, 1992, abandoned.

[30] Foreign Application Priority Data

Mar. 30, 1991 [JP] Japan .................. 3-090978

[51] Int. Cl.⁶ .............................................. B62D 21/15
[52] U.S. Cl. ...................... 180/296; 280/834; 280/784; 296/188; 296/189
[58] Field of Search ............ 296/32.5, 189, 188; 180/309, 89.2, 69.4, 296; 280/834, 784

[56] References Cited

U.S. PATENT DOCUMENTS

| | | | |
|---|---|---|---|
| 3,811,698 | 5/1974 | Glance | 280/784 |
| 4,093,254 | 6/1978 | Ezaki | 280/834 |
| 4,679,820 | 7/1987 | Srock | 296/188 |
| 4,684,151 | 8/1987 | Drewek | 280/784 |
| 4,793,839 | 12/1988 | Hayashida | 280/834 |
| 5,110,177 | 5/1992 | Akio | 280/784 |
| 5,114,184 | 5/1992 | Shimomura | 280/784 |

Primary Examiner—David M. Mitchell
Attorney, Agent, or Firm—Fish & Richardson

[57] ABSTRACT

In an automotive rear body structure, a pair of rear frames extend generally longitudinally of the vehicle body on respective sides thereof and have respective generally rearwardly upwardly extending kick-up portions. A rear suspension cross member extends generally transversely of the vehicle body at a location rearwardly of the kick-up portions. Rearwardly of the rear suspension cross member and in the proximity of the rear frames is disposed one or two silencers. Forwardly of the rear suspension cross member is disposed a fuel tank. A plurality of generally vertically extending notches are formed on those portions of side walls of the rear frames that are positioned rearwardly of the rear suspension cross member so that the kinetic energy of an impact load caused by a rear-end collision may be effectively absorbed by the deformation of the rear frames, thereby protecting the fuel tank. At least one of the rear frames is provided with a reinforcement and the rear suspension cross member is provided with at least one reinforcement so that the fuel tank may be protected against the impact load caused by the rear-end collision.

11 Claims, 7 Drawing Sheets

AUTOMOTIVE REAR BODY STRUCTURE

This application is a continuation of U.S. patent application Ser. No. 07/849,341 filed Mar. 11, 1992, now abandoned.

BACKGROUND OF THE INVENTION

1. Field of the Invention

The present invention relates generally to an automotive body structure and more particularly to an automotive rear body structure capable of effectively absorbing the kinetic energy of an impact load exerted from the rear, for example, when a rear-end collision has occurred.

2. Description of Related Art

FIGS. 13 and 14 depict a conventional automotive rear body structure after a rear-end collision has occurred in which the rear of an automotive vehicle is struck by another automotive vehicle.

The structure shown in FIGS. 13 and 14 comprises a pair of longitudinally extending side sills (a) disposed on respective sides of a vehicle body, a pair of rear wheels (b1) and (b2) disposed rearwardly of respective side sills (a), a pair of longitudinally extending rear frames (c) disposed inwardly of respective side sills (a), and a rear suspension cross member (d) extending transversely between both the rear frames (c) and having opposite ends secured thereto. A pair of outwardly extending suspension arms (e) are secured at their inner ends to the rear suspension cross member (d) and at their outer ends to hubs of the rear wheels (b1) and (b2), respectively. A pair of longitudinally extending trailing arms (f) are secured at their front ends to the rear frames (c) and at their rear ends to the hubs of the rear wheels (b1) and (b2), respectively. Rearwardly of the rear suspension cross member (d) are provided a silencer (g) and a spare tire housing (m). Forwardly of the rear suspension cross member (d) is provided a fuel tank (j) carried by bands (k).

The silencer (g) is provided with tail pipes (h) extending rearwardly therefrom and is connected to an exhaust gas pipe (i) extending generally rearwardly from an engine. Rear ends of the rear frames (c) are connected to a transversely extending rear bumper (n).

The rear frames (c) are bent inwardly at their respective locations where they are connected to the rear suspension cross member (d) and are provided with generally rearwardly upwardly extending respective kick-up portions (c1) formed forwardly of their inwardly bent portions.

In this conventional automotive rear body structure, in the event of a rear-end collision, the tail pipes (h) of the silencer (g) are subjected to little deformation, as shown in FIGS. 13 and 14, and the kinetic energy of an impact load caused by the collision is transmitted to the silencer (g) without damping. Accordingly, the silencer (g) is moved forwardly, thereby pushing and deforming the rear suspension cross member (d). At the same time, the rear frames (c) are pushed forwardly via the rear suspension cross member (d). As a result, the upwardly bent kick-up portions (c1) of the rear frames (c) are subjected to stress concentration, which may cause these portions to be deformed or broken. The forward deformation of the rear suspension cross member (d) occasionally causes deformation of the fuel tank (j), and consequently, there arises a problem in that a considerably deformed portion (p) would be destroyed.

SUMMARY OF THE INVENTION

The present invention has been developed to overcome the above-described disadvantages.

It is an objective of the present invention to provide an improved automotive rear body structure capable of protecting a fuel tank in the event of a rear-end collision, and of reducing adverse effects to a passenger compartment.

In accomplishing this and other objectives, an automotive rear body structure according to the present invention comprises a pair of rear frames extending generally longitudinally of a vehicle body on respective sides thereof and having respective rearwardly upwardly extending kick-up portions, a rear suspension cross member extending generally transversely of the vehicle body at a location rearwardly of the kick-up portions, a silencer disposed longitudinally of the vehicle body at a location in the proximity of one of the rear frames and rearwardly of the rear suspension cross member, and a fuel tank disposed forwardly of the rear suspension cross member. This structure further comprises means for lowering the rigidity of that portion of at least one of the rear frames that is positioned rearwardly of the rear suspension cross member.

The means for lowering the rigidity may be a plurality of generally vertically extending notches formed on side walls of the rear frame.

Advantageously, the means for enhancing the rigidity of at least one of the kick-up portions is provided in the structure. A reinforcement accommodated in and rigidly secured to the kick-up portion is available for this purpose.

Preferably, the means for enhancing the rigidity of the rear suspension cross member is provided forwardly of the silencer as a reinforcement rigidly secured to a bottom wall of the rear suspension cross member.

The means for lowering the rigidity of the rear frame, the means for enhancing the rigidity of the kick-up portion, and the means for enhancing the rigidity of the rear suspension cross member may be provided only on the side of the silencer.

The means for lowering the rigidity of the rear frame causes the rear frame to be deformed in the event of a rear-end collision, thereby effectively absorbing the kinetic energy of an impact load caused by the collision. The means for enhancing the rigidity of the kick-up portion and the rear suspension cross member protects the fuel tank and reduces adverse effects to a passenger compartment.

The present invention is also applicable to an automotive rear body structure having a pair of silencers on respective sides of the vehicle body.

In this case, both the rear frames are provided with respective means for lowering the rigidity thereof and respective means for enhancing the rigidity of the kick-up portions. Furthermore, means for enhancing the rigidity of the rear suspension cross member are provided at locations forwardly of the two silencers.

BRIEF DESCRIPTION OF THE DRAWINGS

Objectives and features of the present invention will become more apparent from the following description of the preferred embodiments with reference to the accompanying drawings. Throughout the drawings the same parts are designated by like reference numerals.

DETAILED DESCRIPTION OF THE PREFERRED EMBODIMENTS

Figure 1:
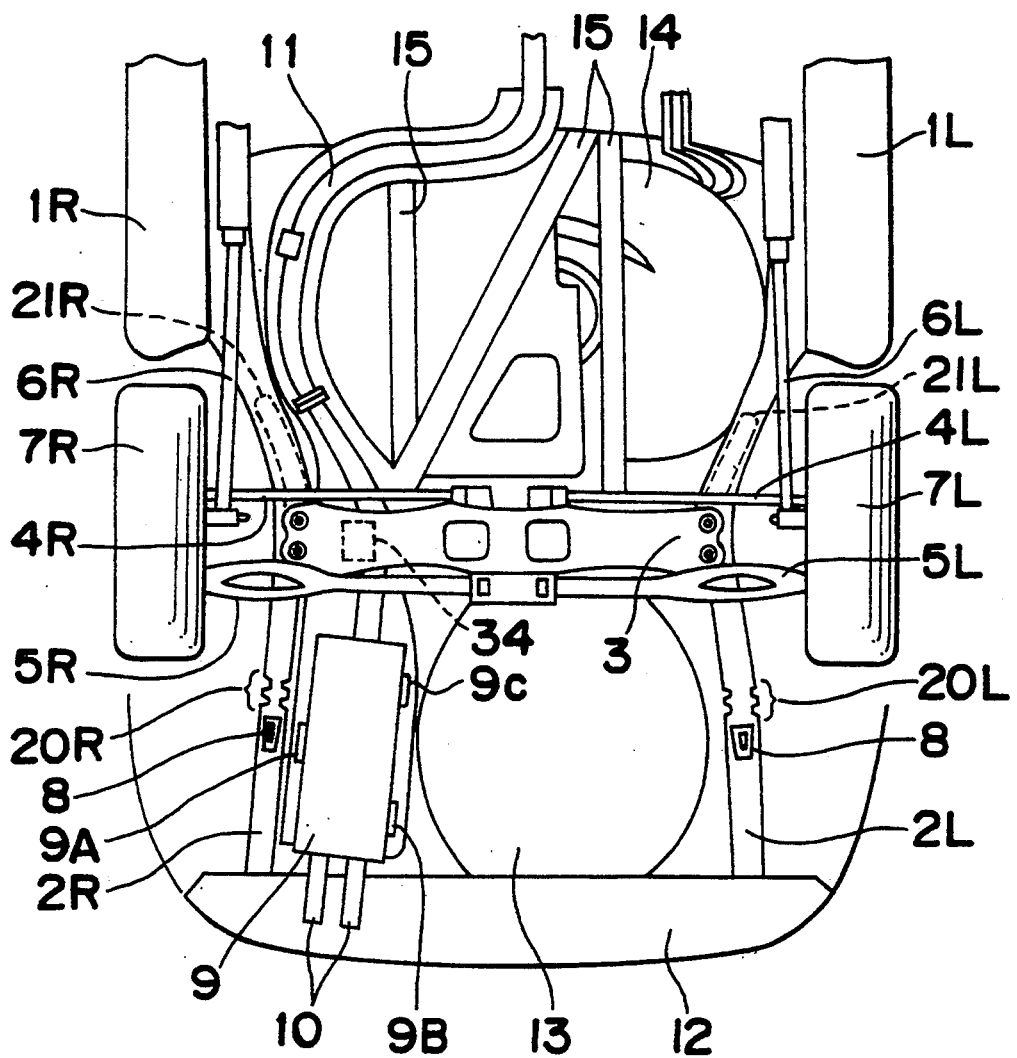
FIG. 1 is a bottom plan view of an automotive rear body structure according to a first embodiment of the present invention.

FIGS. 1 to 10 depict an automotive rear body structure according a first embodiment of the present invention.

This structure comprises a pair of generally longitudinally extending side sills 1R and 1L disposed on respective sides of a vehicle body, a pair of generally longitudinally extending rear frames 2R and 2L disposed inwardly of respective side sills 1R and 1L, and a rear suspension cross member 3 extending transversely between both the rear frames 2R and 2L and having opposite ends secured thereto. A pair of outwardly extending upper suspension arms 4R and 4L and a pair of outwardly extending lower suspension arms 5R and 5L are secured at their inner ends to the rear suspension cross member 3. An outer end of the upper suspension arm 4R and that of the lower suspension arm 5R are secured to a hub of a right-hand side rear wheel 7R whereas an outer end of the upper suspension arm 4L and that of the lower suspension arm 5L are secured to a hub of a left-hand side rear wheel 7L. A pair of generally longitudinally extending trailing arms 6R and 6L are secured at their front ends to the rear frames 2R and 2L and at their rear ends to the hubs of the rear wheels 7R and 7L, respectively. Rearwardly of the rear suspension cross member 3 are provided a silencer 9 and a spare tire housing 13. Forwardly of the rear suspension cross member 3 is provided a fuel tank 14 carried by a plurality of bands 15. Rear ends of the rear frames 2R and 2L are connected to a transversely extending rear bumper 12. The rear frames 2R and 2L are provided with respective hooks 8 secured thereto for the anchoring of a vehicle body.

Figure 2:
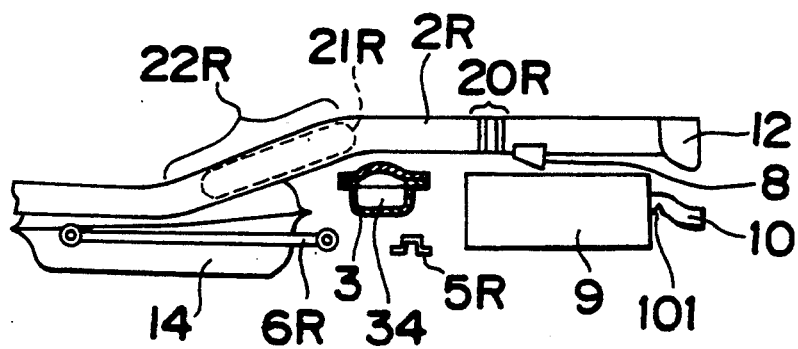
FIG. 2 is a schematic side view, partly in section, of the structure of FIG. 1.

The silencer 9 is disposed along and inwardly of the right-hand side rear frame 2R and is mounted on the lower surface of a rear floor panel by means of a plurality of brackets 9A, 9B and 9C. The silencer 9 is provided with two tail pipes 10 extending rearwardly therefrom and is connected to an exhaust gas pipe 11 extending generally rearwardly from an engine (not shown). As shown in FIG. 2, the tail pipes 10 are provided with respective notches 101 formed on the lower side thereof so that the kinetic energy of an impact load caused by a rear-end collision may be absorbed by the deformation of the tail pipes 10.

It is to be noted that the silencer 9 may be mounted on the right-hand side rear frame 2R.

Figure 3:
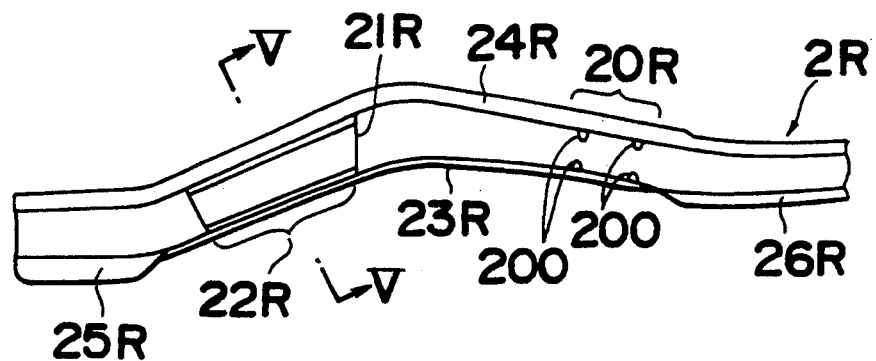
FIG. 3 is a top plan view of a rear frame mounted in the structure of FIG. 1.
Figure 5:
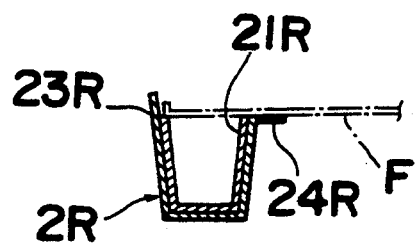
FIG. 5 is a sectional view taken along line V—V in FIG. 3.

As shown in FIGS. 1 to 3, the rear frame 2R is bent inwardly at the location where the rear frame 2R is connected to the rear suspension cross member 3 and is provided with a generally rearwardly upwardly extending kick-up portion 22R formed forwardly of the inwardly bent portion. A reinforcement 21R is accommodated in and rigidly secured to the kick-up portion 22R to enhance the rigidity thereof, as best shown in FIG. 5. A plurality of generally vertically extending notches 200 are formed on side walls of the rear frame 2R rearwardly of the kick-up portion 22R and in the proximity of the front end of the silencer 9 to form a low-rigidity portion 20R.

Figure 4:
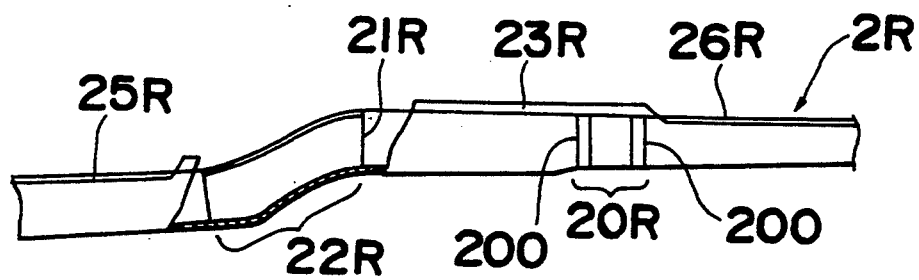
FIG. 4 is a partially cutaway side view of the rear frame of FIG. 3.

The rear frame 2R takes the form of a figure "U" in cross section and has an upwardly open end, as shown in FIG. 5. The rear frame 2R has a flange 24R extending inwardly from an upper edge of an inner side wall thereof, a flange 23R extending upwardly from an upper edge of an outer side wall thereof, and two flanges 25R and 26R formed on respective sides of the flange 23R and extending outwardly from the upper edge of the outer side wall, as shown in FIGS. 3 and 4. The reinforcement 21R accommodated in the kick-up portion 22R also takes the form of a figure "U" in cross section and has an upwardly open end. Both the rear frame 2R and the reinforcement 21R are rigidly secured to the lower surface of a rear floor panel F.

It is to be noted here that the reinforcement 21R may be accommodated in the rear frame 2R with its open end downward so that a closed cross section may be formed inside the rear frame 2R and the reinforcement 21R.

Although the above description has been made with respect to the right-hand side rear frame 2R, the same is true for the left-hand side rear frame 2L.

Figure 6:
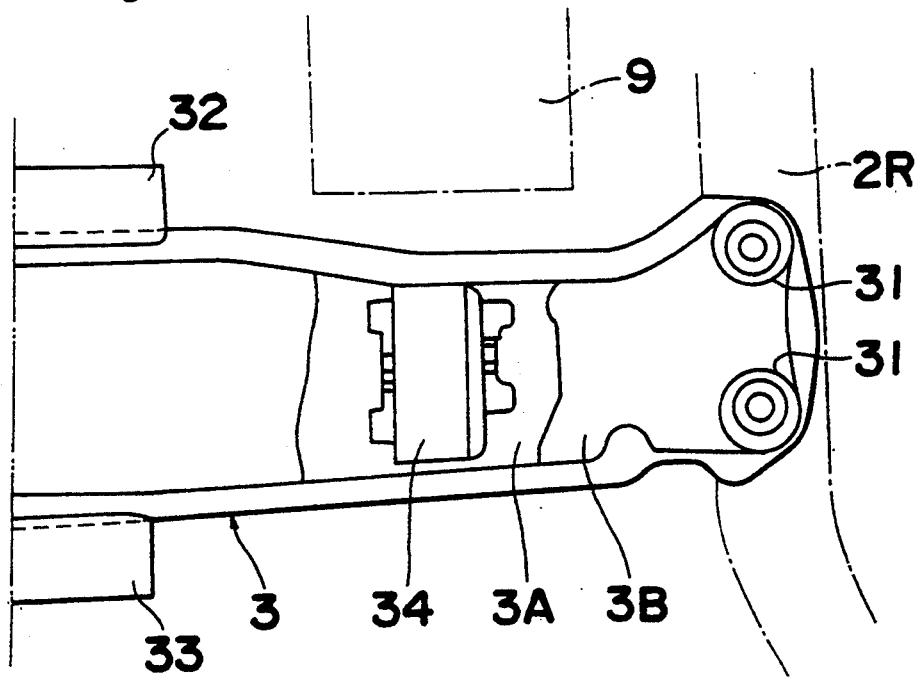
FIG. 6 is a partially cutaway bottom plan view of a rear suspension cross member mounted in the structure of FIG. 1.
Figure 7:
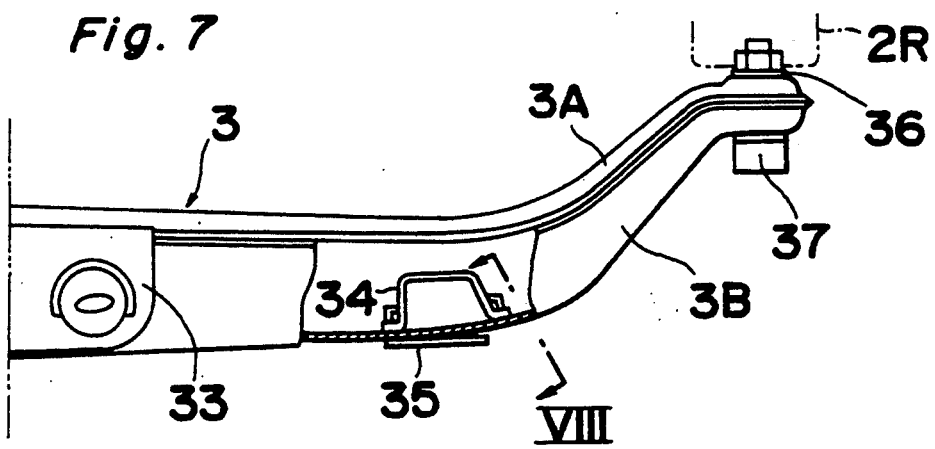
FIG. 7 is a partially cutaway side view of the rear suspension cross member of FIG. 6.
Figure 8:
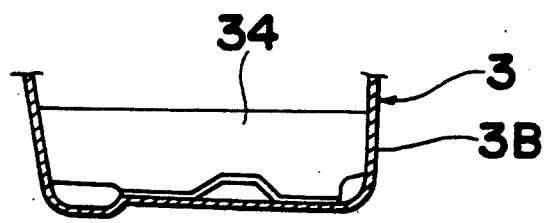
FIG. 8 is a sectional view taken along line VIII—VIII in FIG. 7.

As shown in FIGS. 6 to 8, the transversely extending rear suspension cross member 3 comprises an upper cross member 3A and a lower cross member 3B rigidly secured to each other. The rear suspension cross member 3 is provided at each end thereof with two mounting seats 31, which are connected to the lower surface of the rear frame 2R (2L) by means of bolts and nuts 37 via bushes 36. The rigidity of the rear suspension cross member 3 is enhanced by lengthening the distance between both the mounting seats 31.

A reinforcement 34 made of a plate having a high rigidity is provided in the rear suspension cross member 3 format of the silencer 9. The reinforcement 34 extends throughout the width of the lower cross member 3B in a direction longitudinally of the vehicle body and generally takes the form of a figure "U" in cross section with its open end downward. Because the reinforcement 34 is rigidly secured to a bottom wall of the lower cross member 3B to rigidify it, the rear suspension cross member 3 is subject to little deformation in the event of a rear-end collision in which the silencer 9 is pushed forward and brought into contact with the lower cross member 3B.

in FIGS. 6 and 7, reference numerals 32 and 33 represent a rear link bracket and a front link bracket, respectively, and reference numeral 35 represents a firm plate having a positioning hole or holes required for automatic assembling.

Figure 9:
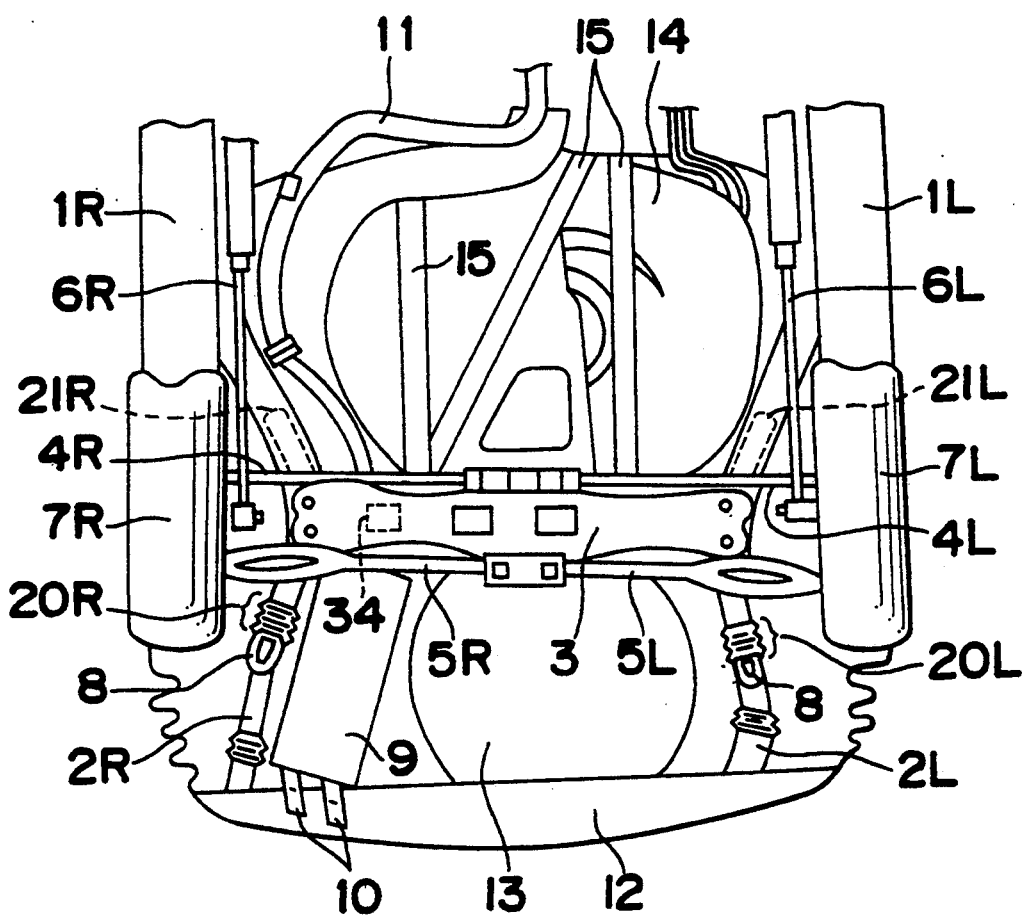
FIG. 9 is a bottom plan view of the structure of FIG. 1 after a rear-end collision has occurred.
Figure 10:
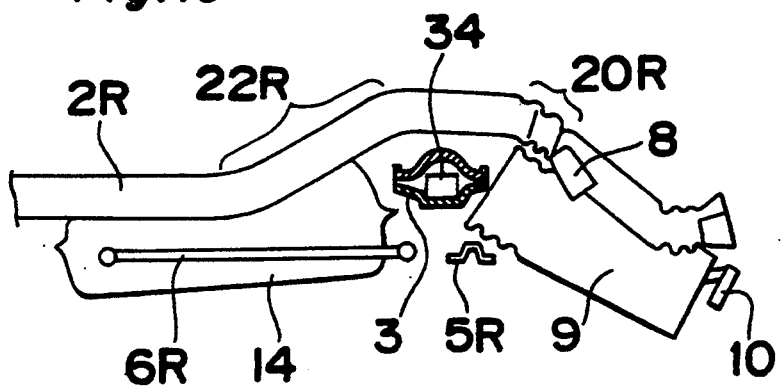
FIG. 10 is a schematic side view, partly in section, of the structure of FIG. 9.

FIGS. 9 and 10 depict the rear body structure after a rear-end collision has occurred.

As shown in FIGS. 9 and 10, the rear-end collision causes the tail pipes 10 to be bent at the location of the notches 101 and also causes the low-rigidity portions 20R and 20L of the rear frames 2R and 2L to be pressed or bent, thereby effectively absorbing the kinetic energy of an impact load caused by the collision. On the other hand, because the kick-up portions 22R and 22L of the rear frames 2R and 2L are rigidified by the reinforcements 21R and 21L, they are subjected to little deformation. Furthermore, even if the silencer 9 is moved forwardly and brought into contact with the rear suspension cross member 3, the rear suspension cross member 3 is subjected to little deformation because it is rigidified by the reinforcement 34. Accordingly, the fuel tank 14 positioned forwardly of the rear suspension cross member 3 is not deformed or damaged, and also, the rear-end collision exerts little influence on a passenger compartment defined in the vehicle body.

Figure 11:
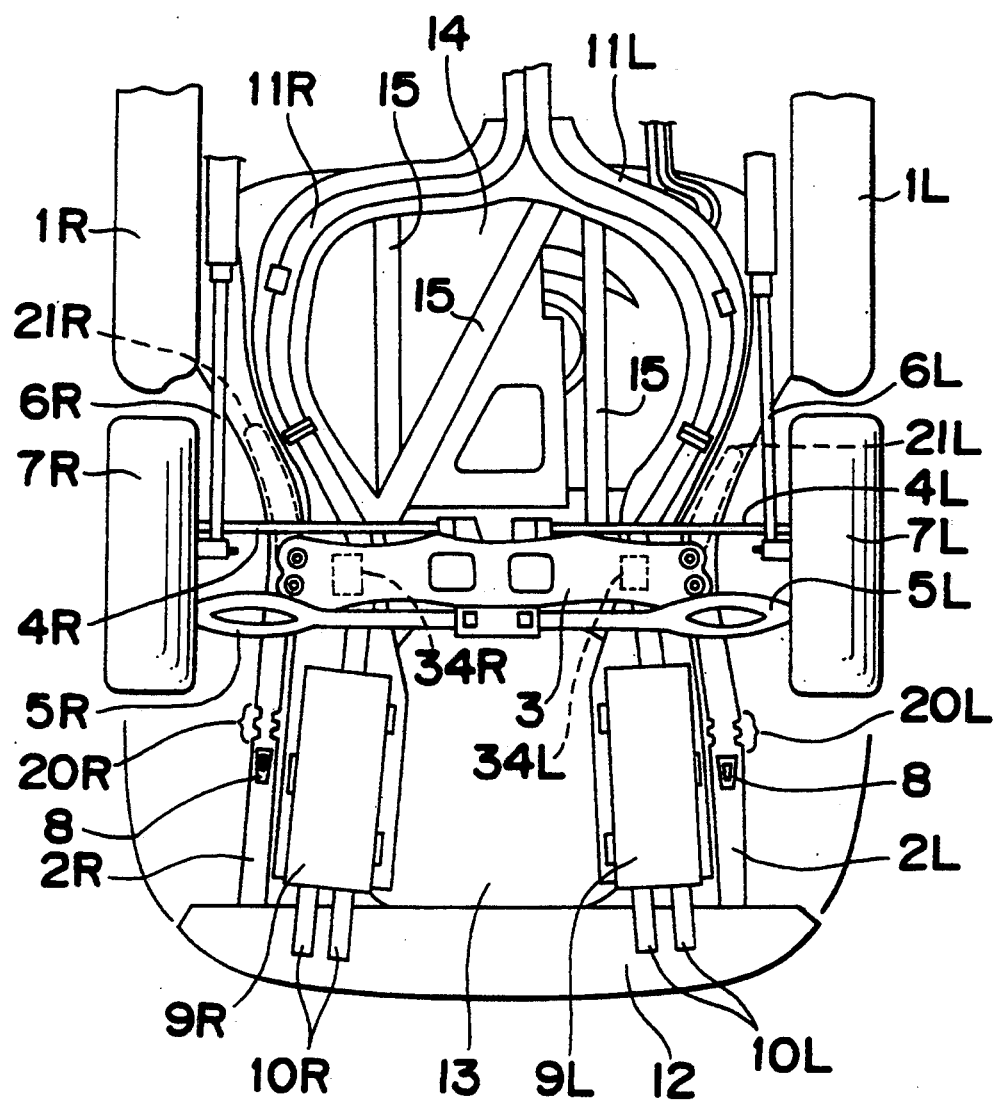
FIG. 11 is a bottom plan view, according to a second embodiment of the present invention.

FIG. 11 depicts an automotive rear body structure according to a second embodiment of the present invention, in which are mounted a pair of silencers 9R and 9L. The silencers 9R and 9L are positioned rearwardly of a rear suspension cross member 3 and are disposed along the rear frames 2R and 2L on respective sides of a vehicle body. The silencers 9R and 9L are provided with respective tail pipes 10R and 10L extending rearwardly therefrom and are connected to respective exhaust gas pipes 11R and 11L extending generally rearwardly from an engine (not shown). The rear suspension cross member 3 is rigidified by a pair of reinforcements 34R and 34L secured thereto and positioned forwardly of the right-hand side silencer 9R and the left-hand side silencer 9L, respectively.

Similar to the first embodiment, the rear frames 2R and 2L are provided with respective low-rigidity portions 20R and 20L formed outwardly of the silencers 9R and 9L and are rigidified by respective reinforcements 21R and 21L provided inside the kick-up portions 22R and 22L positioned forwardly of the low-rigidity portions 20R and 20L, respectively.

In an automotive vehicle having two silencers 9R and 9L, this structure provides the same effects as those discussed above.

More specifically, a rear-end collision causes the low-rigidity portions 20R and 20L of the rear frames 2R and 2L to be pressed or bent, thereby effectively absorbing the kinetic energy of an impact load caused by the collision. Furthermore, the kick-up portions 22R and 22L of the rear frames 2R and 2L and the rear suspension cross member 3 are subjected to little deformation because they are rigidified by respective reinforcements 21R, 21L, 34R and 34L. Accordingly, a fuel tank 14 positioned forwardly of the rear suspension cross member 3 is not deformed or damaged, and the rear-end collision exerts little influence on a passenger compartment defined in the vehicle body.

Figure 12:
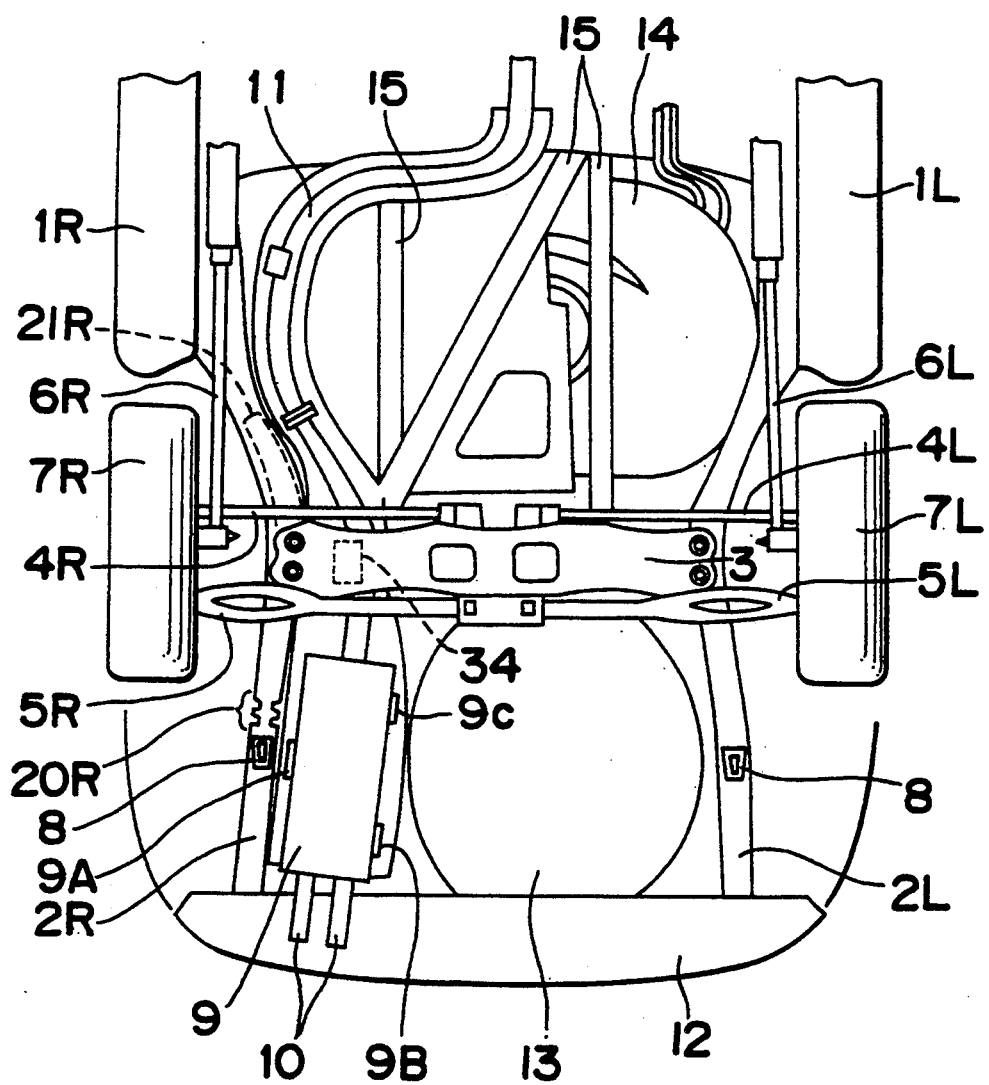
FIG. 12 is a bottom plan view, according to a third embodiment of the present invention.
Figure 13:
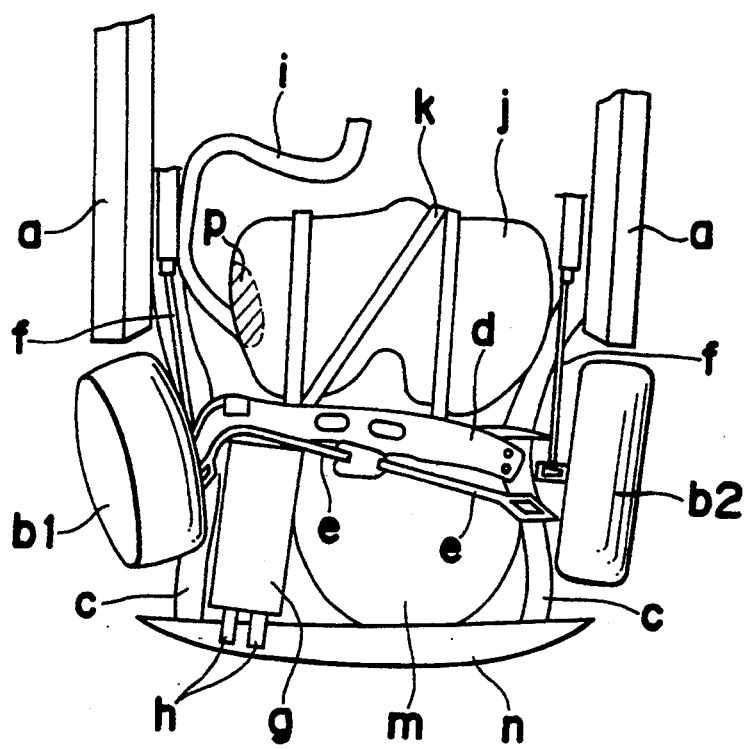
FIG. 13 is a bottom plan view of a conventional automotive rear body structure after a rear-end collision has occurred.
Figure 14:
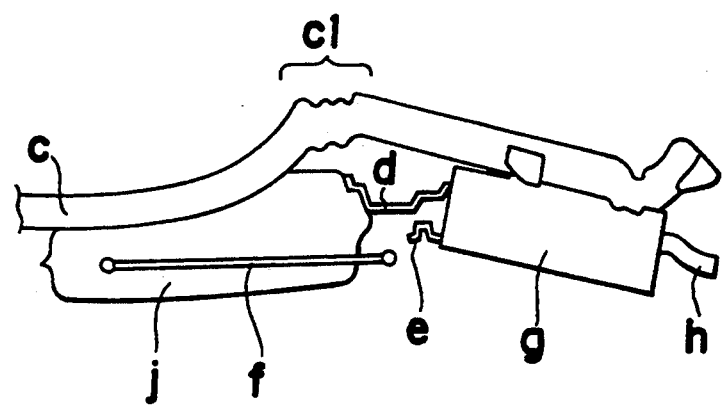
FIG. 14 is a schematic side view of the structure of FIG. 13.

FIG. 12 depicts an automotive rear body structure according to a third embodiment of the present invention, in which a silencer 9 is mounted only on the right-hand side of the vehicle body. In this embodiment, only a right-hand side rear frame 2R is provided with a low-rigidity portion 20R positioned outwardly of the silencer 9 and with a reinforcement 21R rigidly secured inside a kick-up portion formed forwardly of the low-rigidity portion 20R. A rear suspension cross member 3 is provided with a single reinforcement 34 securely mounted forward of the silencer 9.

In this structure, in the event of a rear-end collision, the low-rigidity portion 20R of the right-hand side rear frame 2R is deformed, and the reinforcements 21R and 34 restrain the deformation of the rear frame 2R and that of the rear suspension cross member 3, respectively, thereby protecting a fuel tank 14 and a passenger compartment. In this embodiment, because the low-rigidity portion, the rear frame reinforcement 21R and the cross member reinforcement 34 are provided only on one side of the vehicle body, the manufacturing process can be simplified.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An automotive rear body structure comprising:
 a pair of rear frames extending generally longitudinally of a vehicle body on respective sides thereof and having respective rearwardly upwardly extending kick-up portions;
 a rear suspension cross member extending generally transversely of the vehicle body at a location rearwardly of said kick-up portions;
 means for lowering the rigidity of that portion of at least one of said rear frames that is positioned rearwardly of said rear suspension cross member;
 a silencer disposed longitudinally of the vehicle body at a location in the proximity of one of said rear frames and rearwardly of said rear suspension cross member;
 a fuel tank disposed forwardly of said rear suspension cross member; and
 means for enhancing the rigidity of at least one of said kick-up portions, disposed forwardly of said rear suspension cross member,
 whereby an impact load caused by a rear-end collision is effectively absorbed by said means for lowering the rigidity so that said fuel tank is protected against said impact load.

2. The structure according to claim 1, wherein said means for enhancing the rigidity comprises a reinforcement accommodated in and rigidly secured to said kick-up portion.

3. The structure according to claim 1, wherein said means for enhancing the rigidity is provided only on the side of said silencer.

4. An automotive rear body structure comprising:
 a pair of rear frames extending generally longitudinally of a vehicle body on respective sides thereof and having respective rearwardly upwardly extending kick-up portions;
 a rear suspension cross member extending generally transversely of the vehicle body at a location rearwardly of said kick-up portions;

means for lowering the rigidity of that portion of at least one of said rear frames that is positioned rearwardly of said rear suspension cross member;

a silencer disposed longitudinally of the vehicle body at a location in the proximity of one of said rear frames and rearwardly of said rear suspension cross member;

a fuel tank disposed forwardly of said rear suspension cross member; and means for enhancing the rigidity of said rear suspension cross member, longitudinally aligned with said silencer, whereby an impact load caused by a rear-end collision is effectively absorbed by said means for lowering the rigidity so that said fuel tank is protected against said impact load.

5. An automotive rear body structure comprising:
a pair of rear frames extending generally longitudinally of a vehicle body on respective sides thereof and having respective rearwardly upwardly extending kick-up portions;

a rear suspension cross member extending generally transversely of the vehicle body at a location rearwardly of said kick-up portions;

means for lowering the rigidity of that portion of at least one of said rear frames that is positioned rearwardly of said rear suspension cross member;

a silencer disposed longitudinally of the vehicle body at a location in the proximity of one of said rear frames and rearwardly of said rear suspension cross member;

a fuel tank disposed forwardly of said rear suspension cross member; and means for enhancing the rigidity of said rear suspension cross member, wherein said means for enhancing the rigidity of said rear suspension cross member comprises a reinforcement rigidly secured to a bottom wall of said rear suspension cross member, whereby an impact load caused by a rear-end collision is effectively absorbed by said means for lowering the rigidity so that said fuel tank is protected against said impact load.

6. An automotive rear body structure comprising:
a pair of rear frames extending generally longitudinally of a vehicle body on respective sides thereof and having respective rearwardly upwardly extending kick-up portions;

a rear suspension cross member extending generally transversely of the vehicle body at a location rearwardly of said kick-up portions;

means for lowering the rigidity of those portions of said rear frames that are positioned rearwardly of said rear suspension cross member;

a pair of silencers disposed longitudinally of the vehicle body at locations in the proximity of one of said rear frames and rearwardly of said rear suspension cross member;

a fuel tank disposed forwardly of said rear suspension cross member; and means for enhancing the rigidity of said kick-up portions, disposed forwardly of said rear suspension cross member, whereby an impact load caused by a rear-end collision is effectively absorbed by said means for lowering the rigidity so that said fuel tank is protected against said impact load.

7. The structure according to claim 6, wherein said means for enhancing the rigidity comprises a reinforcement accommodated in and rigidly secured to each of said kick-up portions.

8. An automotive rear body structure comprising:
a pair of rear frames extending generally longitudinally of a vehicle body on respective sides thereof and having respective rearwardly upwardly extending kick-up portions;

a rear suspension cross member extending generally transversely of the vehicle body at a location rearwardly of said kick-up portions;

means for lowering the rigidity of those portions of said rear frames that are positioned rearwardly of said rear suspension cross member;

a pair of silencers disposed longitudinally of the vehicle body at locations in the proximity of one of said rear frames and rearwardly of said rear suspension cross member;

a fuel tank disposed forwardly of said rear suspension cross member; and means for enhancing the rigidity of said rear suspension cross member, longitudinally aligned with said silencers, whereby an impact load caused by a rear-end collision is effectively absorbed by said means for lowering the rigidity so that said fuel tank is protected against said impact load.

9. An automotive rear body structure comprising:
a pair of rear frames extending generally longitudinally of a vehicle body on respective sides thereof and having respective rearwardly upwardly extending kick-up portions;

a rear suspension cross member extending generally transversely of the vehicle body at a location rearwardly of said kick-up portions;

means for lowering the rigidity of those portions of said rear frames that are positioned rearwardly of said rear suspension cross member;

a pair of silencers disposed longitudinally of the vehicle body at locations in the proximity of one of said rear frames and rearwardly of said rear suspension cross member;

a fuel tank disposed forwardly of said rear suspension cross member; and means for enhancing the rigidity of said rear suspension cross member, wherein said means for enhancing the rigidity of said rear suspension cross member comprises two reinforcements rigidly secured to a bottom wall of said rear suspension cross member, whereby an impact load caused by a rear-end collision is effectively absorbed by said means for lowering the rigidity so that said fuel tank is protected against said impact load.

10. An automotive rear body structure comprising:
a pair of rear frames extending generally longitudinally of a vehicle body on respective sides thereof and having respective rearwardly upwardly extending kick-up portions;

a rear suspension cross member extending generally transversely of the vehicle body at a location rearwardly of said kick-up portions;

means for lowering the rigidity of that portion of at least one of said rear frames that is positioned rearwardly of said rear suspension cross member;

a silencer disposed longitudinally of the vehicle body at a location in the proximity of one of said rear frames and rearwardly of said rear suspension cross member;

a fuel tank disposed forwardly of said rear suspension cross member;

means for enhancing the rigidity of at least one of said kick-up portions; and means for enhancing the rigidity of said rear suspension cross member, longitudinally aligned with said silencer, whereby said fuel tank is protected against an impact load caused by a rear-end collision, and whereby an impact load caused by a rear-end collision is effectively absorbed by said means for lowering the rigidity so that said fuel tank is protected against said impact load.

11. An automotive rear body structure comprising:

a pair of rear frames extending generally longitudinally of a vehicle body on respective sides thereof and having respective rearwardly upwardly extending kick-up portions;

a rear suspension cross member extending generally transversely of the vehicle body at a location rearwardly of said kick-up portions;

means for lowering the rigidity of those portions of said rear frames that are positioned rearwardly of said rear suspension cross member;

a pair of silencers disposed longitudinally of the vehicle body at locations in the proximity of said rear frames and rearwardly of said rear suspension cross member;

a fuel tank disposed forwardly of said rear suspension cross member; and means for enhancing the rigidity of said kick-up portions; and means for enhancing the rigidity of said rear suspension cross member, longitudinally aligned with said silencers, whereby said fuel tank is protected against an impact load caused by a rear-end collision, and whereby an impact load caused by a rear-end collision is effectively absorbed by said means for lowering the rigidity so that said fuel tank is protected against said impact load.

* * * * *